United States Patent
Liu et al.

(10) Patent No.: US 12,384,002 B2
(45) Date of Patent: Aug. 12, 2025

(54) COMPOSITE PAD FOR CHEMICAL MECHANICAL POLISHING

(71) Applicant: Rohm and Haas Electronic Materials CMP Holdings, Inc., Newark, DE (US)

(72) Inventors: Zhan Liu, Hockessin, DE (US); Nan-Rong Chiou, Wilmington, DE (US); Michael E. Mills, Bear, DE (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 638 days.

(21) Appl. No.: 17/660,096

(22) Filed: Apr. 21, 2022

(65) Prior Publication Data

US 2023/0339067 A1    Oct. 26, 2023

(51) Int. Cl.
*B24B 37/24* (2012.01)
*B24B 37/26* (2012.01)
*C08L 27/18* (2006.01)
*C08L 75/04* (2006.01)

(52) U.S. Cl.
CPC .............. *B24B 37/24* (2013.01); *B24B 37/26* (2013.01); *C08L 27/18* (2013.01); *C08L 75/04* (2013.01)

(58) Field of Classification Search
CPC ......... B24B 37/24; B24B 37/26; C08L 27/18; C08L 75/04
See application file for complete search history.

(56) References Cited

U.S. PATENT DOCUMENTS

| | | | |
|---|---|---|---|
| 6,106,754 A * | 8/2000 | Cook | B29C 43/006 51/293 |
| 6,413,153 B1 * | 7/2002 | Molar | B24D 7/063 451/259 |
| 9,056,382 B2 | 6/2015 | Litke et al. | |
| 2005/0042976 A1 * | 2/2005 | Ronay | B24B 37/24 451/41 |
| 2008/0014841 A1 | 1/2008 | Ronay | |
| 2020/0384601 A1 | 12/2020 | Islam et al. | |
| 2020/0384602 A1 | 12/2020 | Gadinski et al. | |
| 2020/0384603 A1 * | 12/2020 | Chiou | B24B 37/24 |

* cited by examiner

*Primary Examiner* — Alexandra M Moore
(74) *Attorney, Agent, or Firm* — Blake T. Biederman

(57) ABSTRACT

A chemical mechanical polishing pad comprising a substantially non-porous polishing layer, the polishing layer comprising a polymer matrix and agglomerates of polymer particles embedded in the polymer matrix wherein the polymer particles are present in amounts of 5 to 35 weight percent based on weight of the polishing layer, the agglomerates have a size of greater than 1 μm, the polymer particles have a tensile modulus higher than a tensile modulus of the polymer matrix. The polishing layer viscoelastic and has a GEL of greater than 1000 Pa$^{-1}$. Polishing a metal/insulator composite with such a pad can result in low amounts of dishing of the metal feature.

10 Claims, 1 Drawing Sheet

COMPOSITE PAD FOR CHEMICAL MECHANICAL POLISHING

FIELD OF THE INVENTION

The field of this invention is chemical mechanical polishing and pads useful in chemical mechanical polishing.

BACKGROUND

Chemical mechanical planarization (also referred to as chemical mechanical polishing or CMP) is a polishing process that is widely used to flatten, or planarize, the layers during manufacture of integrated circuits. The objectives of CMP are to remove excess material on the substrate (e.g., a silicon wafer bearing various electroactive and electrically dielectric layers) surface to produce an extremely flat layer of a uniform thickness, said uniformity extending across the entire wafer area. Control of removal rate and the uniformity of removal are of paramount importance.

CMP utilizes a liquid, often called slurry, which can contain nano-sized particles. The slurry can be fed onto the surface of a rotating chemical mechanical polishing pad, which is mounted on a rotating platen. The substrate to be polished or planarized is mounted into a separate fixture, or carrier, which has a separate means of rotation, and pressed against the surface of the pad under a controlled load. This leads to a high rate of relative motion between the substrate and the polishing pad that abrades the substrate surface, leading to removal of material and planarization.

To control rate, prevent hydroplaning, and to efficiently convey slurry under the wafer, various types of texture are incorporated into the upper surface of the polishing pad. Fine scale texture (microtexture) can be produced by conditioning (i.e., abrading) the pad with, for example, an array of fine diamonds. This fine-scale texture is random in nature. Larger scale texture such as grooves or elevated features (also termed macrotexture) of various patterns, such as cross-hatch, circular, radial, and the like, and dimensions can facilitate slurry transport and hydrodynamics.

The pads are typically multilayer polymeric based materials having a subpad layer and a polishing layer. The polishing layer commonly comprises closed cell porous material. The cellular structure that is exposed during conditioning and wafer polishing provides good microtexture. For non-porous pads, as outlined in U.S. Pat. No. 5,489,233, the conditioning process is critical, as it is the primary source of microtexture that forms the contacting asperities. For non-porous pads, shear during use wears away the microtexture resulting in pad glazing. Thus, to reduce that loss of microtexture, commercially produced and used non-porous pads typically have both a high shear and elastic modulus.

While pads having porous closed cells can be effective for polishing dielectric layers used in integrated circuit manufacture, they tend to be less desirable for the polishing of metal/dielectric composite structures, such as structures having metal interconnects of copper or tungsten. Specifically, porous pads can have lower rigidity, can suffer texture collapse, and can lead to slurry effluent hold up in pores. In polishing of metal/dielectric composite layers, these properties can lead to dishing of metal or other performance issues such as reduced removal rate or increased defects.

In the latter instance, the fabrication sequence for wiring structures includes a step-wise build-up of layered structures, which can be substantially as follows: (a) A layer of insulator is deposited, and a patterned mask having open areas is applied to the insulator surface. (b) Open areas are then etched to produce recesses or vias in the insulator, and the mask is removed. (c) A metal is deposited that fills the etched holes and can cover the entire surface. (d) The deposited metal layer is then polished to remove the excess metal (referred to as metal overburden) and expose the filled vias (now conductive plugs). Steps of the process can then be repeated as many times as desired to build three dimensional planar wiring structures. The polishing of these composite structures gives rise to two types of non-planarity (erosion and dishing) that are undesirable.

Erosion refers to the differential thinning of the insulating material of the wiring structure between the metal features (e.g., plugs) once the metal overburden is removed. This can occur during continuing polishing often termed overpolish.

Dishing is an increase in the surface topography of a composite structure after the metal overburden is cleared. This dishing is associated with the excess removal of metal, such as copper that was deposited within an etched structure; and dishing typically continuously increases during the overpolish. One source of dishing is the difference in CMP removal rate between the two (or more) materials of the composite. Since the conducting metal usually has a higher removal rate, dishing occurs as a recess in the final metal structure. Dishing is a significant source of resistance variation and contact reliability in the final built structure.

As device structures scale down, both dishing and defectivity requirements become increasingly stringent.

SUMMARY OF THE INVENTION

Disclosed herein is a chemical mechanical polishing pad comprising a substantially non-porous polishing layer, the polishing layer comprising a polymer matrix and agglomerates of polymer particles embedded in the polymer matrix wherein the polymer particles are present in amounts of 5 to 35 weight percent based on weight of the polishing layer, the agglomerates have a size of greater than 1 μm, the polymer particles have a tensile modulus higher than a tensile modulus of the polymer matrix. The polishing layer is viscoelastic. The polishing layer can have a GEL of greater than 1000 $Pa^{-1}$.

Also disclosed herein is a method comprising polishing a composite structure of metal features surrounded by insulating material using the pad as disclosed herein.

BRIEF DESCRIPTION OF THE DRAWINGS

Referring now to the figures, which are exemplary embodiments.

DETAILED DESCRIPTION OF THE INVENTION

Figure 1:
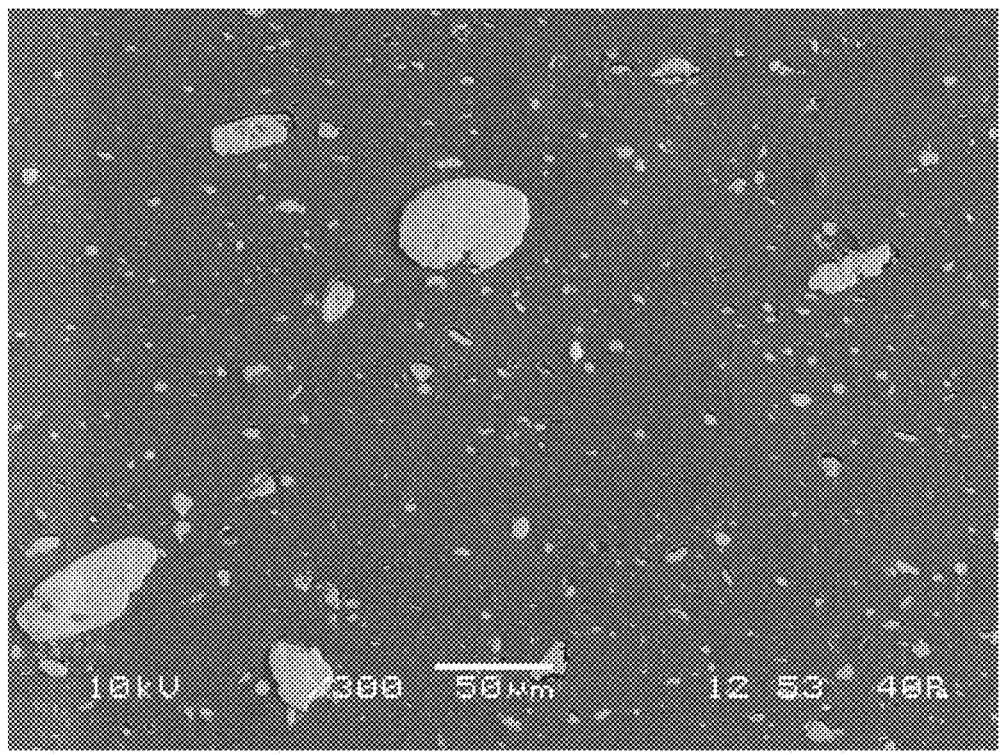
FIG. 1 is a photomicrograph of the surface of a polishing layer of a pad before conditioning, illustrating polymeric particles of a polymer-polymer composite as disclosed herein.

The chemical mechanical polishing pad as disclosed herein comprises a polishing layer. The polishing layer is substantially non-porous or is non-porous. As used herein, "substantially non-porous" means that the polishing layer comprises less than 5, less than 1, less than 0.5, or less than 0.1 volume % void space. As used herein, "non-porous"

means no voids are intentionally introduced into the polishing layer while recognizing that it is possible that certain random voids may arise as an unintended artifact during formation of the polishing pad. However, the polishing layer can be free of voids.

The polishing layer comprises polymer matrix with agglomerates of polymeric particles dispersed therein.

The polymer matrix has a tensile modulus. The tensile modulus of the polymer matrix can be from 50 up to 200, up to 150, or up to 120 megapascals (MPa) at 23° C. according to ASTM D412-16. The polymer matrix can have a tan delta (tan δ) over a temperature range from 20 to 40° C. of 0.13 to 0.3 according to ASTM-5279-21. The polymer matrix can have Shore D hardness of 25 to 70, 30 to 60, or 35 to 50 as measured according to ASTM D2240-15.

The polymer matrix can comprise a variety of polymeric materials such as polyurethane, polybutadiene, polyethylene, polystyrene, polypropylene, polyester, polyacrylamide, polyvinyl alcohol, polyvinyl chloride polysulfone and polycarbonate. The polymer matrix can comprise a polyurethane. The polymer matrix can comprise a thermoplastic polyurethane. For purposes of this specification, "polyurethanes" are products derived from difunctional or polyfunctional isocyanates, e.g., polyetherureas, polyisocyanurates, polyurethanes, polyureas, polyurethaneureas, copolymers thereof and mixtures thereof.

The polyfunctional isocyanate used in the formation of the polishing layer of the chemical mechanical polishing pad of the present invention can be selected from the group consisting of an aliphatic polyfunctional isocyanate, an aromatic polyfunctional isocyanate and a mixture thereof. The polyfunctional isocyanate used in the formation of the polishing layer of the chemical mechanical polishing pad of the present invention can be, for example, selected from the group consisting of 2,4-toluene diisocyanate; 4,4'-diphenylmethane diisocyanate; naphthalene-1,5-diisocyanate; isophorone diisocyanate; hexamethylene diisocyanate; 4,4'-dicyclohexylmethane diisocyanate; or, mixtures thereof.

Polyols (e.g. diols) that can react with the isocyanate functionality can be polyethers (e.g. HO—(R—O)$_n$—H, where R is an alkyl group of 2, 3, 4, or 5 carbon atoms, and n is the desired number of repeat units to provide the desired weight average molecular weight such as 250-3000 g/mol), such as for example polyethylene glycols, polypropylene glycols or polytetramethylene ether glycol) or polyesters (e.g., HO—(O—R—C(=O))$_n$-L-(C(=O)—R—O)$_n$—H where R is an alkyl of 2, 3, 4, or 5 carbon atoms, n is the desired number of repeat units to provide the desired weight average molecular weight such as 250-3000 g/mol), and L is a linking group such as an ether (e.g. —O—R—O— or —O—R—O—R—O—. where R is an alkyl group of 1, 2, 3, or 4 carbon atoms)

Thermoplastic polyurethanes comprise a hard segment and a soft segment formed by reaction of diisocyanates with short chain diols and diisocyanates with long chain diols.

The polishing layer includes polymeric particles as agglomerates in the polymer matrix. The polymeric particles have a tensile modulus that is higher than the tensile strength of the polymer matrix. The tensile modulus of the polymer used in the polymer particles can be greater than 400, or greater than 500 up to 2000, up to 1500 or up to 1000 MPa at 20° C. Measuring tensile modulus directly on the polymer particles can be challenging. Thus, the tensile modulus can be approximated from a bulk polymer with similar composition as the particles. The tensile modulus of such bulk polymer can be as measured by ASTM D412-16 or can be derived from vendor published data regarding such bulk polymers. Direct measurement of hardness of the polymer particles can also be challenging but again can be approximated from a bulk polymer with similar composition to the particles according to ASTM D2240 (2015) or from vendor published data on such bulk polymer. For example, the hardness of the bulk polymer of the polymer particles can be at least 50, or at least 55 to up to 100, or up to 75.

The polymer particles form agglomerates in the polymer matrix. For purposes of the specification, agglomerates are clusters of three or more particles where the spacing between adjacent particles is less than the particle size of the particles. These agglomerates unexpectedly improve planarization efficiency. The agglomerates can have sizes of 1 to 100 μm, preferably 2 to 70 μm, as determined by scanning electron microscopy (SEM). More of the agglomerates can be in the lower portion of the size range with a tail of a few agglomerates in the higher range. For example, a majority (e.g., at least 80% or at least 90%) of the agglomerates can be smaller than 10 μm, or smaller than 5 μm and minority (e.g., less than 20 or less than 10% of the agglomerates can be larger than 10 μm). A small minority (e.g. less than 5 or less than 3% of the agglomerates can be larger than 20 μm. Agglomerates can be a single particle or can be an agglomeration of more than one particle. The polymer particles can have a size of 1 to 20 or 2 to 10 μm. Particle size can be nominal particle size as stated by the vendor. Alternatively, particle size can be measured by particle size analyzer such as a Mastersizer™ from Malvern Panalytical.

The amount of polymer particles in the polishing layer can be 5 to 35, or 8 to 25 weight percent based on total weight of the polishing layer.

Examples of polymeric particles include fluoropolymers, polylactide, polycarbonates, or polyurethanes with a higher modulus than the modulus of the polymer matrix. Preferably the polymeric particle is a fluoropolymer. Fluorinated polymer particles (PTFE, PFA) when used as powder in commercial pad formulations show improvement in defects and polishing removal rate when polishing semiconductor substrates with cationic abrasives. The chemical structures of acceptable fluorinated additives are below as follows: (a) PTFE (polytetrafluoroethylene); (b) PFA (Copolymer of tetrafluoroethylene (TFE) and perfluoroalkylvinylethers (PFAVE)); (c) FEP (Copolymer of tetrafluoroethylene (TFE) and hexafluoropropylene (HFP)) or (d) PVF (polyvinylfluoride). Additional acceptable examples of fluoropolymers are ETFE (ethylene tetrafluoroethylene), PVDF (polyvinylidene fluoride) and ECTFE (ethylene chlorotrifluoroethylene). Preferably, the fluoropolymer is selected from PTFE, PFA, FEP, PVF, ETFE, ECTFE and combinations thereof.

The polishing layer of the chemical mechanical polishing pad of the present invention may optionally further contain a plurality of microelements, such as abrasive particulates, water soluble materials, and/or an insoluble phase material (e.g., mineral oil). The polishing layer can be free of such additives. Such additives can be present in amounts up to about 25, up to about 20, up to about 15, up to about 10 weight percent based on total weight of the polishing layer. At the same time, when present, such additives can be present in an amount of at least 0.1 or 1 weight percent based on total weight of the polishing layer. The polishing layer can be free of entrapped gas bubbles, hollow core polymeric materials, liquid filled hollow core polymeric materials. The polishing pad can be free of additional solid microelements.

The polishing layer of the chemical mechanical polishing pad of the present invention can exhibit a Shore D hardness of 25 to 70, 30 to 60, or 35 to 50 as measured according to ASTM D2240 (2015). Hardness of the polishing layer can be measured directly on the polishing layer regardless of whether the polishing layer includes pores or not.

The polishing layer can have a flexural rigidity of, for example, 500 to 1500, or 700 to 1200 N-mm$^2$ as measured by ASTM D7264/D7264M-21(2021) "Standard Test Method for Flexural Properties of Polymer Matrix Composite Materials".

The composition of the polishing layer (solid material without pores present) can have a tensile modulus from 50 up to 200, up to 150, or up to 120 megapascals (MPa) at 23° C. according to ASTM D412-16. The composition of the polishing layer (without pores present) can have an elastic storage modulus, G', at 30° C. of less than 125 MPa (e.g., from 50 up to 125 or up to 100 MPa) as measured according to ASTM 5279-08. The composition of the polishing layer can have a tan delta (tan δ) over a temperature range from 20 to 40° C. of 0.13 to 0.3 according to ASTM-5279-08 (2008). All modulus numbers (G') were obtained on an Ares G2 model instrument (by TA instruments) in using samples having a dimension of 36 mm×6.5 mm with a 20 mm gap between clamps. The instrument settings were as follows:

Nitrogen atmosphere
Start temp –100° C. Inherent set point: Off
Soak time: 20.0 s Wait for temperature: On
Ramp rate 3.0° C./min.
Soak time after ramp 0.0 s
Estimated time to complete 1:23:00 h:min:s
Sampling interval 10 s/pt
Strain % 0.2%
Single point
Angular frequency 10 rad/s
Acquisition Mode: Correlation is selected
Delay cycles 0.5
Delay time 3.0 s
Sampling cycles 2 half cycles
Frequency based on correlation: Off Save waveform (point display): Off Save image: Off
Iterative Strain
Adjustment: Off Use additional harmonics: Off
Superimpose steady shear rate: Off Maintain Axial Force during acquisition: On
Enabled: Off Enabled: Off Enabled: Off The material of the polishing layer can have a tensile strength as measured by ASTM D412-16 of at least 30, at least 31, at least 31.5 or at least 32 MPa.

The composition of the polishing layer is viscoelastic. The composition of the polishing layer can have an "Energy Loss Factor" (GEL) as determined by ASTM 5279-08 ("Standard Terminology Relating to Dynamic Mechanical Measurements of Plastics" that is incorporated by reference in its entirety for all useful purposes) of greater than 1000 Pa$^{-1}$, for examples from 1000, from 1200, or from 1500 up to 3000 Pa$^{-1}$. Note that GEL is calculated for the material of the polishing layer without pores regardless of whether the polishing layer includes pores or not. GEL is the energy per unit volume lost in each deformation cycle. In other words, it is a measure of the area within the stress-strain hysteresis loop. The Energy Loss Factor (GEL) is a function of both tan δ(G"/G') and the elastic storage modulus (G') at 40° C. and can be defined by the following equation:

$$GEL = \tan \delta * 10^{12}/[G' \times (1+(\tan \delta)^2)]$$

where G' is in Pascals.

The polishing layer can have an average thickness of 500 to 4000, 700 to 3500, 1000 to 3000, or 1300 to 2500 µm.

The polishing pads disclosed herein show a good balance of reduced dishing and good removal rate. The non-porous pads are also less susceptible to glazing than other non-porous pads. Without wishing to be bound, the higher GEL of the disclosed pads, may contribute to reduced dishing while the inclusion of the particle agglomerates may assist in the avoidance of glazing.

The CMP polishing pad of the present invention can optionally further comprise at least one additional layer interfaced with the polishing layer. Preferably, the CMP polishing pad optionally further comprises a compressible base layer adhered to the polishing layer. The compressible base layer preferably improves conformance of the polishing layer to the surface of the substrate being polished.

The CMP polishing pad of the present invention in its final form further comprises the incorporation of texture of one or more dimensions on its upper surface. These may be classified by their size into macrotexture or microtexture.

Common types of macrotexture employed for CMP control hydrodynamic response and slurry transport, and include, without limitation, grooves of many configurations and designs, such as annular, radial, cross-hatchings, and projections such as pillars. These may be formed via machining processes to a thin uniform sheet, or may be directly formed on the pad surface via a net shape molding process. The magnitude of such macrotexture can be on the order of 0.25 to 2 mm. In other words, from the lowest portion of the surface of the pad to the highest, the distance can be from 0.25 up to 2, or up to 1 mm. However, the pad can be free of macrotexture.

The polishing pad disclosed herein can have good microtexture and can be resistant to glazing. The microtexture comprises finer scale features that create a population of surface asperities that are the points of contact with the substrate wafer where polishing occurs. Common types of microtexture include, without limitation, texture formed by abrasion with an array of hard particles, such as diamond (often referred to as pad conditioning), either prior to, during or after use, and microtexture formed during the pad fabrication process. For example, the pads as disclosed herein can have a post-polish roughness of 100 µm or more, e.g., 100-120 µm as determined by confocal microscope as described in Z. Liu, and T. Buley, Advanced CMP Pad Surface Texture Characterization and Its Impact on Polishing, NCCAVS CMPUG spring meeting 2016, Austin, TX, April 2016.

The CMP polishing pad of the present invention can be suitable to be interfaced with a platen of a polishing machine. The CMP polishing pad can be affixed to the platen of a polishing machine, for example using at least one of a pressure sensitive adhesive and vacuum.

An important step in substrate polishing operations can be determining an endpoint to the process. Thus, the pad can include a window, which is transparent to select wavelengths of light. During polishing, a light beam is directed through the window to the substrate surface, where it reflects and passes back through the window to a detector (e.g., a spectrophotometer). Based on the return signal, properties of the substrate surface (e.g., the thickness of films thereon) can be determined for endpoint detection purposes. To facilitate such light based endpoint methods, the chemical mechanical polishing pad of the present invention, optionally further comprises an endpoint detection window. Preferably, the endpoint detection window is selected from an integral window incorporated into the polishing layer and a plug in place endpoint detection window block incorporated into the chemical mechanical polishing pad. For unfilled pads of the present invention that have sufficient transmittance, the upper pad layer itself can be used as the window aperture.

If the polymer phase of pads of the present invention exhibit phase separation, a transparent region of the top pad material can also be produced by locally increasing the cooling rate during fabrication to locally inhibit phase separation, resulting in a more transparent region suitable for use as the endpointing window.

CMP polishing pads are used in conjunction with a polishing slurry, as described in the background of the invention.

Thus, also disclosed herein is a method comprising polishing a composite structure of metal features surrounded by insulating material using the pad as disclosed herein. The metal features can comprise any metal such as those commonly used for interconnects in integrated circuits. The metal can for example comprise tungsten or copper. For example, a portion of the metal features can have dimensions on the order of 5 to 100 μm or width. The polishing yields on such a structure can have dishing of less than 100, or less than 90 Angstroms.

Hardness of the polishing layer is measured according to ASTM D2240 (2015). Flexural rigidity of the polishing layer is determined according to ASTM D7264/D7264M-21 (2021) "Standard Test Method for Flexural Properties of Polymer Matrix Composite Materials".

Data are shown in Table 1. For comparison, the properties of certain porous commercial pads of thermoplastic polyurethane matrix are also shown. Note that for these porous pads, hardness and modulus of rigidity are determined for polishing layers including pores while tensile and elasticity properties are for the matrix polymer composition without pores.

TABLE 1

| Pad ID | Shore D Hardness | Tensile Strength (MPa) | Elongation at Break (%) | Tensile Modulus at 20° C. (MPa) | Flexural Rigidity at 20° C. (N-mm$^2$) | Tg (from tan delta plot) | G' at 30° C. (MPa) | G" at 30° C. (MPa) | G' at 40° C. (MPa) | G'(30° C.)/G'(90° C.) | Tan Delta at 40° C. | GEL at 40° C. (Pa$^{-1}$) |
|---|---|---|---|---|---|---|---|---|---|---|---|---|
| A | 41 | 33 | 691 | 90 | 925 | 15 | 65 | 13 | 48 | 3.96 | 0.15 | 3140 |
| B | 42 | 33 | 636 | 99 | 1018 | 15 | 87 | 16 | 64 | 4.15 | 0.15 | 2271 |
| C | 55 | 24 | 459 | 199 | Not tested | 15 | 150 | 27 | 34 | 13.3 | 0.16 | 1424 |
| IC1000 | 66 | 49 | 242 | 420 | 2888 | 80 | 285 | 24 | 243 | 3.6 | 0.11 | 372 |
| IK4350 | 63 | 304 | 304 | 388 | 2530 | 68 | 267 | 28 | 214 | 4.3 | 0.12 | 549 |

EXAMPLES

Example 1

Two sets of polishing pads were prepared by molding using thermoplastic polyurethane as a matrix material or base polymer.

Comparative Pad A was produced solely with the base polymer.

Inventive Pad B had a 10 weight percent addition of polytetrafluoroethylene (PTFE) particles (Zonyl™ MP1200 from The Chemours Company FC, LLC) during product compounding or blending of the PTFE particles into the molten base polymer. The PTFE particles are estimated to have, based on properties of similar PTFE bulk materials, a Shore D hardness of about 60 and a tensile modulus of about 550 MPa. They have a mean particle size of 3 μm with a narrow size distribution and a specific surface area is 1.5-3 m$^2$/g.

Comparative Pad C used submicron sized polylactide particles rather than the PTFE particles. Polylactide has an estimated 73 Shore D hardness and an estimated tensile modulus of 310 to 5620 MPa according to published literature and test method ISO 527-2.

The pads had cylindrical pillar macrostructure. Both pads had identical thickness and subpad (SP2310 polyurethane foam subpad from DuPont Electronic Materials).

The polishing layer material was characterized for tensile properties according to ASTM D412-16, and elastic storage modulus (G') and tan delta according to ASTM 5279-08. GEL is calculated from G' and tan delta as set forth above.

Figure 2:
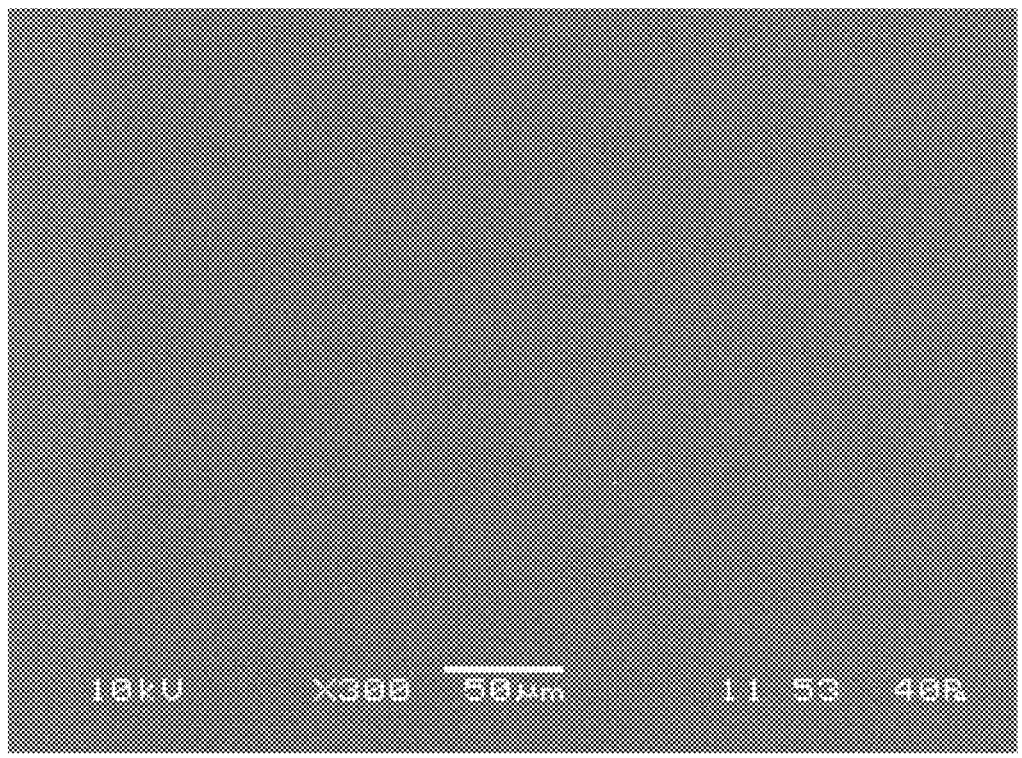
FIG. 2 is a photomicrograph of the surface of a comparative polishing layer before conditioning that does not include the polymeric particles as disclosed herein.

Photomicroscopy at 300× magnification of Inventive Pad B is shown in FIG. 1 where the light colored regions are agglomerates of the PTFE particles. While FIG. 2 of Pad A without filler does not show large shading differences associated with visible agglomerates. Agglomerates in the micron size range were also not seen in Pad C.

Example 2

Comparative Pad A, Inventive Pad B, and a Comparative Pad C were used to polish blanket 300 mm Tungsten wafers to assess differences in removal rate and the roughness determined using confocal microscope as described herein of the conditioned pad surface. Identical processes were used for all pads. A commercially available Tungsten slurry was employed. Results are summarized in Table 2.

Pad B, the inventive pad, showed significantly higher polishing rate and conditioned pad surface texture. The non-composite Pad A showed lower post-polished roughness, which was not improved using a more aggressive pad conditioner having larger diamonds. In contrast, the inventive Pad B showed pad roughness that could be altered by the change in the conditioner. Pad C, which does not have the agglomerate size, had similar roughness and poorer removal rate than the control comparative Pad A without any polymer particulate additive.

TABLE 2

|  | Comparative Pad A | Inventive Pad B | Comparative Pad C |
|---|---|---|---|
| Tungsten removal rate (Å/min) | 734 | 815 | 563 |
| Post-polish roughness in um after 210 um diamond conditioner (Peak to Valley (P/V)) | 76 | 111 | 81 |
| Post-polish roughness in μm after 250 um diamond conditioner (P/V) | 75 um | 125 um | — |

Example 3

Patterned tungsten test wafers were also polished and examined to assess the effects of the second polymer addition on dishing. Of particular interest were the results for via arrays of varying tungsten via diameter and spacing. Both wafers were polished to end-point with an additional 20 percent overpolish time. Significant differences in via dishing were observed as shown in Table 3. In the case of comparative Pad A, dishing values decrease directly as via diameter decreased. In contrast, inventive Pad B showed low and essentially constant dishing levels over the range of via diameters examined. The interpretation of these results is that the improvement is due to the combination of the improved stiffness produced in Pad B by the addition of the second higher modulus polymer in combination with the desirably high GEL value. This lack of feature size response is very desirable in device processing, as, in practice, there can be a wide range of via dimensions in actual circuitry. The lack of dishing variation substantially improves the ability to produce uniform electrical response when fabricating multilayer devices.

TABLE 3

| | Dishing observed in via in Angstroms | | | |
|---|---|---|---|---|
| line feature (via width/via spacing) | 100 um/ 100 um | 10 um/ 10 um | 7 um/ 7 um | 0.1 um/ 0.1 um |
| Comparative Pad A | 217 | 176 | 164 | 66 |
| Inventive Pad B | 73 | 80 | 87 | 51 |

This disclosure further encompasses the following aspects.

Aspect 1: A chemical mechanical polishing pad comprising a substantially non-porous, preferably non-porous, polishing layer, the polishing layer comprising a polymer matrix and agglomerates of polymer particles embedded in the polymer matrix wherein the polymer particles are present in amounts of 5 to 35, preferably 8 to 25, weight percent based on weight of the polishing layer, the agglomerates have a size of greater than 1 μm, the polymer particles have a tensile modulus higher than a tensile modulus of the polymer matrix, and the polishing layer is characterized as being viscoelastic and having a GEL of greater than 1000, preferably 1500 to 3000 $Pa^{-1}$.

Aspect 2. The chemical mechanical polishing pad of Aspect 1 wherein a minority portion of the agglomerates comprise an aggregate of more than one of the polymer particles and have a agglomerate size of 10 to 100 μm.

Aspect 3. The chemical mechanical polishing pad of Aspect 1 or 2 wherein the polymer particles comprise polytetrafluoroethylene.

Aspect 4: The chemical mechanical polishing pad of any of the previous Aspects wherein the average size of the polymer particles is in the range of 1 to 20, preferably 1 to 10, more preferably 1 to 5 μm.

Aspect 5: The chemical mechanical polishing pad of any of the previous Aspects wherein at least 80 percent of the agglomerates have a size of less than 10, preferably less than 5 μm.

Aspect 6: The chemical mechanical polishing pad of any of the previous Aspects comprising less than 5, less than 1, less than 0.5, or less than 0.1 volume percent void space in the polishing layer based on total volume of the polishing layer.

Aspect 7: The chemical mechanical polishing pad of any of the previous Aspects wherein the polymer matrix has a tensile modulus of from 50 up to 200, preferably 50 to 150, and more preferably 50 to 120 megapascals (MPa) at 23° C. according to ASTM D412-16 (2016).

Aspect 8: The chemical mechanical polishing pad of any of the previous Aspects wherein the polymer matrix has a tan delta (tan δ) over a temperature range from 20 to 40° C. of 0.13 to 0.3 according to ASTM-5279-08.

Aspect 9: The chemical mechanical polishing pad of any of the previous Aspects wherein the polymer matrix has a Shore D hardness of 25 to 70, preferably 30 to 60, and more preferably 35 to 50 as measured, for example, according to ASTM D2240-15.

Aspect 10: The chemical mechanical polish pad of any of the previous Aspects wherein the polymer matrix comprises a thermoplastic polyurethane.

Aspect 12: The chemical mechanical polish pad of any of the previous Aspects wherein the polishing layer has a Shore D hardness of 25 to 70, preferably 30 to 60, and more preferably 35 to 50 as measured according to ASTM D2240-15.

Aspect 13: The chemical mechanical polish pad of any of the previous Aspects wherein the polishing layer has a flexural rigidity of 500 to 1500, preferably 700 to 1200 $N-mm^2$ as measured by ASTM D7264/D7264M-21.

Aspect 14: The chemical mechanical polish pad of any of the previous Aspects wherein the polishing layer has an elastic storage module, G', at 30° C. of less than 125 MPa, preferably 50 to 125, more preferably 50 to100 MPa as measured for example according to ASTM 5279-08.

Aspect 15: The chemical mechanical polish pad of any of the previous Aspects wherein the polishing layer has a thickness of 500 to 4000, preferably 700 to 3500, more preferably 1000 to 3000, and most preferably 1300 to 2500 μm.

Aspect 16: The chemical mechanical polish pad of any of the previous Aspects wherein a tensile modulus of the polymer used in the polymer particles can be greater than 400, or greater than 500 up to 2000, up to 1500 or up to 1000 MPa at 20° C.

Aspect 17: The chemical mechanical polish pad of any of the previous Aspects wherein a Shore D hardness of the polymer particles is 50 to 100 or 55 to 75.

Aspect 18: The chemical mechanical polish pad of any of the previous Aspects wherein the polishing layer has a Shore D hardness of 25 to 70, preferably 30 to 60, more preferably 35 to 50 as measured for example according to ASTM D2240-15.

Aspect 19. The chemical mechanical polishing pad of any of the previous Aspects wherein the polishing layer has a macrotexture of one or more of the following: grooves, projections.

Aspect 20: A method comprising polishing a composite structure of metal features surrounded by insulating material using the pad of any of the previous Aspects.

Aspect 21. The method of Aspect 20 wherein a portion the metal features have dimensions 5-100 μm and the polishing yields a structure having less than 100 Angstroms of dishing in the metal feature.

Aspect 22: The method of Aspect 20 or 21 wherein the metal feature comprises tungsten or copper.

Aspect 23. The method of any one of Aspects 20-22 wherein polishing layer has a post-polish roughness of greater than 100 μm.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). Moreover, stated upper and lower limits can be combined to form ranges (e.g. "at least 1 or at least 2 weight percent" and "up to 10 or 5 weight percent" can be combined as the ranges "1 to 10 weight percent", or "1 to 5 weight percent" or "2 to 10 weight percent" or "2 to 5 weight percent"). All compositions are in weight percent, (wt. %), unless specifically noted otherwise.

The disclosure may alternately comprise, consist of, or consist essentially of, any appropriate components herein disclosed. The disclosure may additionally, or alternatively, be formulated so as to be devoid, or substantially free, of any components, materials, ingredients, adjuvants or species used in the prior art compositions or that are otherwise not necessary to the achievement of the function or objectives of the present disclosure.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

Unless specified to the contrary herein, all test standards are the most recent standard in effect as of the filing date of this application, or, if priority is claimed, the filing date of the earliest priority application in which the test standard appears.

What is claimed is:

1. A chemical mechanical polishing pad comprising a substantially non-porous polishing layer, the polishing layer comprising a polymer matrix and agglomerates of polymer particles embedded in the polymer matrix wherein the polymer particles are present in amounts of 5 to 35 weight percent based on weight of the polishing layer, the agglomerates have a size of greater than 1 μm, the polymer particles have a tensile modulus higher than a tensile modulus of the polymer matrix, and the polishing layer is viscoelastic.

2. The chemical mechanical polishing pad of claim 1 wherein a minority portion of the agglomerates comprise an aggregate of more than one of the polymer particles and have a agglomerate size of 10 to 100 μm.

3. The chemical mechanical polishing pad of claim 1 wherein the polymer particles comprise polytetrafluoroethylene.

4. The chemical mechanical polishing pad of claim 1 wherein the polymer matrix comprises a thermoplastic polyurethane.

5. The chemical mechanical polishing pad of claim 1 wherein the energy loss factor, GEL is from 1000 to 3000 $Pa^{-1}$.

6. The chemical mechanical polishing pad of claim 1 wherein the polishing layer has a macrotexture of one or more of the following: grooves, projections.

7. The chemical mechanical polishing pad of claim 1 wherein the polishing layer has a flexural rigidity of 500 to 1500 Newtons-$mm^2$, as measured by ASTM D7264/D7264M-21.

8. A method comprising polishing a composite structure of metal features surrounded by insulating material using the pad of claim 1.

9. The method of claim 8 wherein a portion of the metal features have dimensions 5-100 μm and the polishing yields a structure having less than 100 Angstroms of dishing in the metal feature.

10. The method of claim 8 wherein polishing layer has a post-polish roughness of greater than 100 μm.

* * * * *